United States Patent
Song et al.

(10) Patent No.: US 12,360,228 B2
(45) Date of Patent: Jul. 15, 2025

(54) HUMAN DETECTION METHOD AND DEVICE, ELECTRONIC APPARATUS AND STORAGE MEDIUM

(71) Applicants: Gree Electric Appliances, Inc. of Zhuhai, Zhuhai (CN); Zhuhai Leayun Technology Co., Ltd, Zhuhai (CN)

(72) Inventors: Dechao Song, Guangdong (CN); Chong Chen, Guangdong (CN); Xiaoyu Luo, Guangdong (CN); Dong Yue, Guangdong (CN); Xiangwen Chen, Guangdong (CN); Chaohong Ye, Guangdong (CN)

(73) Assignees: Gree Electric Appliances, Inc. of Zhuhai, Zhuhai (CN); Zhuhai Leayun Technology Co., Ltd, Zhuhai (CN)

( * ) Notice: Subject to any disclaimer, the term of this patent is extended or adjusted under 35 U.S.C. 154(b) by 572 days.

(21) Appl. No.: 17/623,658

(22) PCT Filed: Jun. 28, 2020

(86) PCT No.: PCT/CN2020/098362
§ 371 (c)(1),
(2) Date: Dec. 29, 2021

(87) PCT Pub. No.: WO2021/004299
PCT Pub. Date: Jan. 14, 2021

(65) Prior Publication Data
US 2022/0252712 A1    Aug. 11, 2022

(30) Foreign Application Priority Data
Jul. 5, 2019    (CN) .......................... 201910605656.9

(51) Int. Cl.
*G01S 13/58*    (2006.01)
*G01S 7/41*    (2006.01)

(52) U.S. Cl.
CPC .............. *G01S 13/58* (2013.01); *G01S 7/415* (2013.01)

(58) Field of Classification Search
CPC ................................ G01S 13/58; G01S 7/415
See application file for complete search history.

(56) References Cited

U.S. PATENT DOCUMENTS

| 2006/0267533 | A1* | 11/2006 | Sasaki ..................... E05F 15/73 318/466 |
| 2014/0320335 | A1 | 10/2014 | Lee et al. |

(Continued)

FOREIGN PATENT DOCUMENTS

| CN | 106855941 A | 6/2017 |
| CN | 107422318 A | 12/2017 |

(Continued)

OTHER PUBLICATIONS

International Search Report, with a mailing date of Sep. 28, 2020, in International application No. PCT/CN2020/098362, filed on Jun. 28, 2020 (5 pages).

(Continued)

*Primary Examiner* — Vladimir Magloire
*Assistant Examiner* — Maxine McKenzie Phillips
(74) *Attorney, Agent, or Firm* — McAndrews, Held & Malloy, Ltd.

(57) ABSTRACT

The present disclosure discloses a human detection method and device, an electronic apparatus, and a storage medium. The method includes: a millimeter-wave radar signal of a target environment (101) is obtained; information of a moving point in the target environment (102) is extracted from the millimeter-wave radar signal; a micro-Doppler feature of each target in the target environment (103) is determined according to the information of the moving points in the target environment, wherein the target is (Continued)

formed by at least one moving point; and a target whose category is human in the target environment (104) is identified according to the micro-Doppler feature of each target in the target environment. The millimeter-wave radar technology is combined with artificial intelligence technology, so as to enable human detection in the target environment without invading human privacy, thus providing the possibility of achieving automatic control, monitoring and other operations of the target environment.

10 Claims, 4 Drawing Sheets

(56) References Cited

U.S. PATENT DOCUMENTS

2017/0123058 A1    5/2017   Yavari et al.
2019/0087009 A1*   3/2019   Rao .......................... G01S 7/352

FOREIGN PATENT DOCUMENTS

| | | | | |
|---|---|---|---|---|
| CN | 107506794 A | * | 12/2017 | ........... G06K 9/6256 |
| CN | 108256488 A | | 7/2018 | |
| CN | 109239703 A | | 1/2019 | |
| CN | 109375215 A | | 2/2019 | |
| CN | 109375217 A | | 2/2019 | |
| CN | 109557535 A | | 4/2019 | |
| CN | 109581312 A | | 4/2019 | |
| CN | 109581361 A | | 4/2019 | |
| CN | 110488264 A | | 11/2019 | |
| EP | 3460507 A1 | * | 3/2019 | ........... A61B 5/0205 |

OTHER PUBLICATIONS

Priority Search Report from application No. CN 201910605656.9, filed Jul. 5, 2019.

* cited by examiner

HUMAN DETECTION METHOD AND DEVICE, ELECTRONIC APPARATUS AND STORAGE MEDIUM

CROSS-REFERENCE TO RELATED APPLICATION

The present disclosure a 371 of International Patent Application No. PCT/CN2020/098362, filed Jun. 28, 2020, which claims the priority of Chinese Application No. 201910605656.9, filed in the Chinese Patent Office on Jul. 5, 2019, and entitled "HUMAN DETECTION METHOD AND DEVICE, ELECTRONIC APPARATUS AND STORAGE MEDIUM", the entire contents of which are herein incorporated by reference.

TECHNICAL FIELD

The present disclosure relates to the technical field of signal processing, and in particular, to a human detection method and device, an electronic apparatus and a storage medium.

BACKGROUND

With the continuous development of radar technology, the characteristics of high sensitivity, no direct contact and strong penetrability of radar signals have attracted more and more attention from researchers. The application range of the radar signals has expanded from the original military field to the civil field, for example, the use of terahertz radar imaging technology, mechanical vibration measurement technology and human vital sign detection technology in airport security inspection instruments.

With the development of artificial intelligence technology, the application of the radar technology in artificial intelligence has also become an important development direction.

SUMMARY

The present disclosure provides a human detection method and device, an electronic apparatus, and a storage medium, so as to combine millimeter-wave radar technology with artificial intelligence technology to achieve human detection in a target environment.

In a first aspect, the present disclosure provides a human detection method, including: obtaining a millimeter-wave radar signal of a target environment; extracting, from the millimeter-wave radar signal, information of a moving point in the target environment; determining, according to the information of the moving point in the target environment, a micro-Doppler feature of each target in the target environment, wherein the target is formed by at least one the moving point; and identifying, according to the micro-Doppler feature of each target in the target environment, a target whose category is human in the target environment.

In some embodiments, after identifying, according to the micro-Doppler feature of each target in the target environment, the target whose category is human in the target environment, the method further includes: performing statistics on the information of the target whose category is human in the target environment, and obtaining a statistical result; and managing the target environment according to the statistical result.

In some embodiments, the information of the moving point includes: speed information and position information of the moving point.

In some embodiments, determining, according to the information of the moving points in the target environment, the micro-Doppler feature of each target in the target environment includes: according to the information of the moving points in the target environment, clustering the moving point in the target environment to obtain at least one clustering result, and taking each clustering result as a target; tracking each target to obtain the information of each target in consecutive N frames, wherein the information of the target includes information of each moving point corresponding to the target, and N is an integer greater than 1; and respectively performing the following processing on each target in the target environment: determining, according to the information of each target in the consecutive N frames, the micro-Doppler feature of the target.

In some embodiments, determining, according to the information of each target in the consecutive N frames, the micro-Doppler feature of the target includes: performing statistics on the speed information of the moving point corresponding to the target in the consecutive N frames, and determining, according to a statistical result, a maximum Doppler speed, a minimum Doppler speed and an average Doppler speed of the moving point corresponding to the target in the consecutive N frames, wherein N is an integer greater than 1; and determining the maximum Doppler speed, the minimum Doppler speed and the average Doppler speed as the micro-Doppler feature of the target.

In some embodiments, identifying, according to the micro-Doppler feature of each target in the target environment, the target whose category is human in the target environment includes: respectively performing the following processing on each target in the target environment: inputting the micro-Doppler feature of the target into a classifier model, and determining whether a category to which the target belongs is human according to a classification result output by the classifier model, wherein the classifier model is obtained by training a binary classifier model by means of using sample data, and the sample data includes a set of human micro-Doppler features and a set of non-human micro-Doppler features.

In some embodiments, before extracting, from the millimeter-wave radar signal, the information of the moving points in the target environment, the method further includes: removing, from the millimeter-wave radar signal, the information of the moving point that does not belong to the target environment; and/or, removing, from the millimeter-wave radar signal, the information of the moving point that does not enter the target environment from a specified area.

In a second aspect, the present disclosure provides a human detection device, including: an obtaining module, configured to obtain a millimeter-wave radar signal of a target environment; an extraction module, configured to extract, from the millimeter-wave radar signal, information of a moving point in the target environment; a determining module, configured to determine, according to the information of the moving point in the target environment, a micro-Doppler feature of each target in the target environment, wherein the target is formed by at least one of the moving point; and an identification module, configured to identify, according to the micro-Doppler feature of each target in the target environment, a target whose category is human in the target environment.

In a third aspect, the present disclosure provides an electronic apparatus, including: a processor, a communication interface, a memory and a communication bus, wherein the processor, the communication interface and the memory complete the communication with each other through the communication bus; the memory is configured to store a computer program; and the processor is configured to execute the program stored in the memory, so as to implement the human detection method.

In a fourth aspect, the present disclosure provides a computer-readable storage medium that stores a computer program, and the computer program implements the human detection method when executed by a processor.

Compared with the prior art, the above technical solutions provided by the embodiments of the present disclosure have the following advantages: according to the method provided by the embodiments of the present disclosure, the target in the target environment is identified by using the millimeter-wave radar signal, and the target whose category is human is identified in the target environment, therefore the millimeter-wave radar technology is combined with artificial intelligence technology, so as to enable human detection in the target environment without invading human privacy, thus providing the possibility of achieving automatic control, monitoring and other operations of the target environment.

BRIEF DESCRIPTION OF THE DRAWINGS

The drawings herein are incorporated in and constitute a part of the specification, illustrate embodiments consistent with the present disclosure, and are used for explaining the principles of the present disclosure together with the specification.

To illustrate technical solutions in the embodiments of the present disclosure or in the prior art more clearly, a brief introduction on the drawings which are needed in the description of the embodiments or the prior art is given below. Apparently, it will be obvious to those of ordinary skill in the art that, other drawings can also be obtained on the basis of these drawings without any creative effort.

DETAILED DESCRIPTION OF THE EMBODIMENTS

In order that the purposes, technical solutions and advantages of the present disclosure are clearer, a clear and complete description of the technical solutions in the embodiments of the present disclosure will be given below, in combination with the drawings in the embodiments of the present disclosure. Apparently, the embodiments described below are merely a part, but not all, of the embodiments of the present disclosure. All of other embodiments, obtained by those of ordinary skill in the art based on the embodiments of the present disclosure without any creative effort, fall into the protection scope of the present disclosure.

It should be noted that, in the following embodiments, a moving point refers to a point in a moving state, and relative to the moving point, a stationary point refers to a point in a stationary state.

Figure 1:
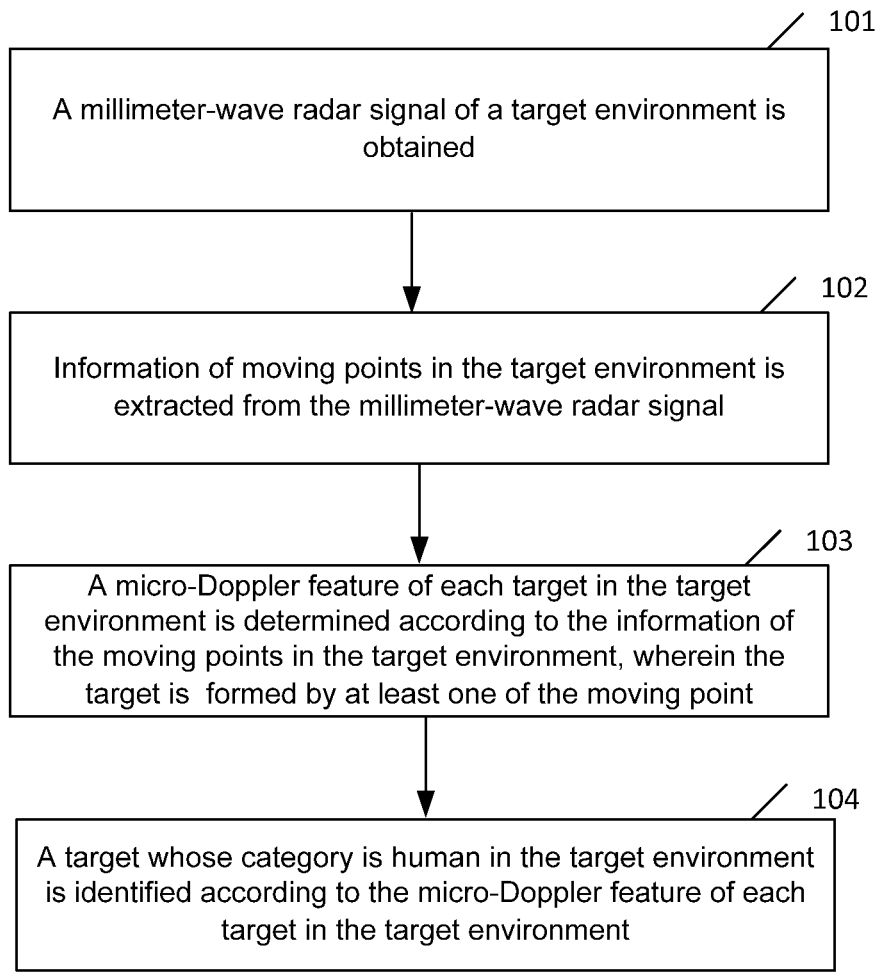
FIG. 1 is a schematic flowchart of a human detection method provided by an embodiment of the present disclosure.

FIG. 1 is a schematic flowchart of a human detection method provided by an embodiment of the present disclosure, the method may be applied to any electronic apparatus, the electronic apparatus itself may be integrated with a millimeter-wave radar, or itself is not integrated with the millimeter-wave radar, but can obtain a millimeter-wave radar signal or store the millimeter-wave radar signal. The human detection process mainly includes the following steps:

Step 101: a millimeter-wave radar signal of a target environment is obtained.

Parameters such as an area boundary of the target environment may be input by a user in advance, and may also be obtained by its own measurement.

Figure 2:
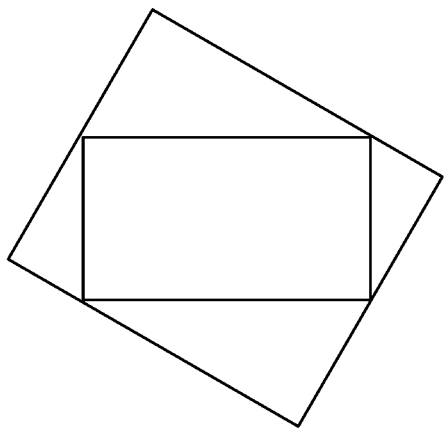
FIG. 2 is a schematic diagram of a target environment and a detection area provided by an embodiment of the present disclosure.

For example, as shown in FIG. 2, an inner rectangular area is the area of the target environment, an outer rectangular area is an area that can be detected by the radar, and then the boundary used for determining the target environment may be input by the user in advance.

Step 102: information of a moving point in the target environment is extracted from the millimeter wave radar signal.

In one embodiment, after the millimeter-wave radar signal of the target environment is obtained, an interference signal in the millimeter-wave radar signal is removed at first, and then the information of the moving point in the target environment is extracted from the millimeter-wave radar signal after the interference data is removed. By removing the interference data, the calculation amount can be reduced, the calculation efficiency can be improved, and the accuracy of calculation results can be improved.

For example, the information of the moving point that does not belong to the target environment is removed from the millimeter-wave radar signal; or, the information of the moving point that does not enter the target environment from a specified area is removed from the millimeter-wave radar signal; or, the information of the moving point that does not belong to the target environment is removed from the millimeter-wave radar signal, and the information of the moving point that does not enter the target environment from a specified area is removed from the millimeter-wave radar signal.

Figure 3:
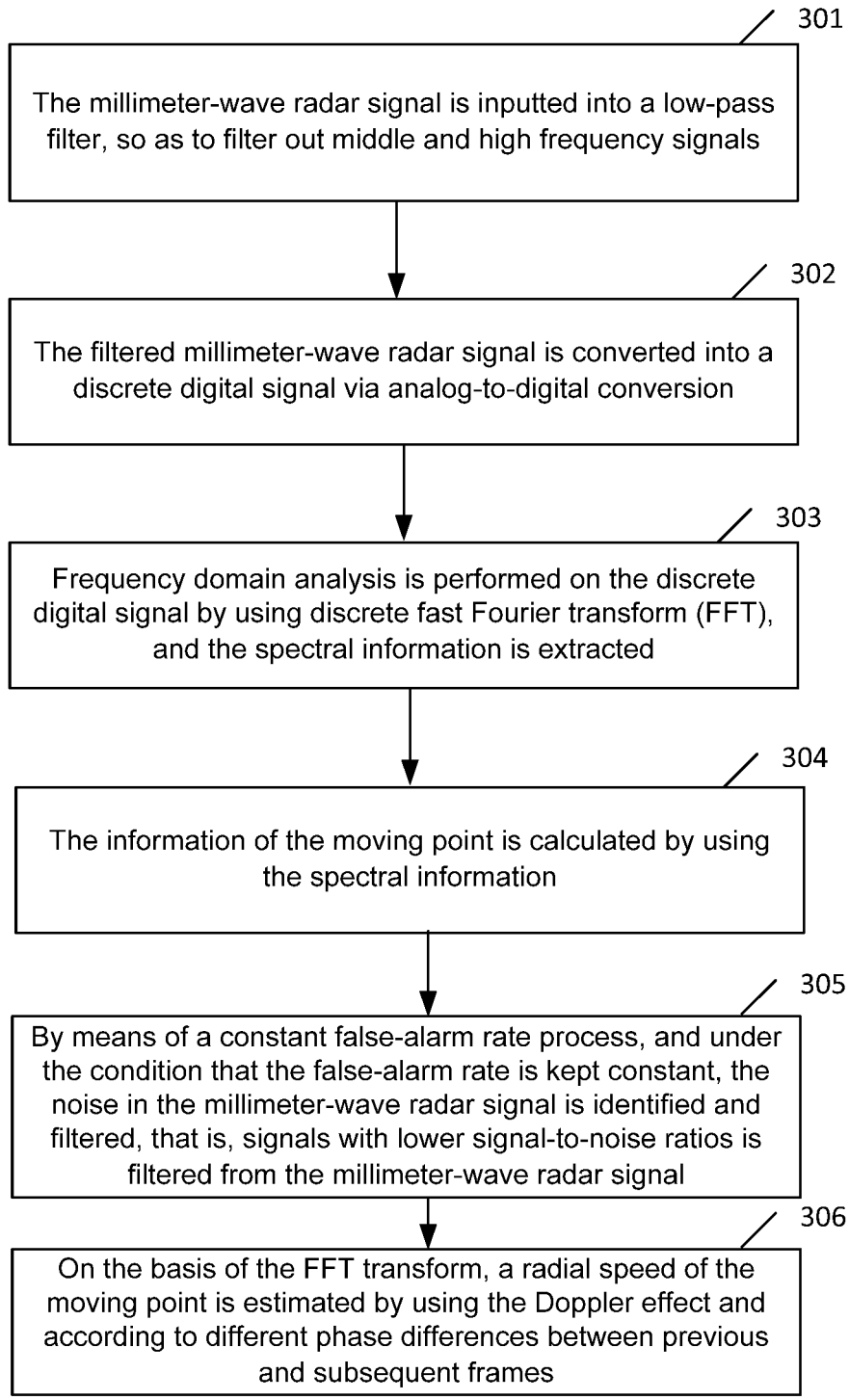
FIG. 3 is a schematic diagram of an echo signal processing process of a millimeter-wave radar provided by an embodiment of the present disclosure.

In one embodiment, as shown in FIG. 3, an echo signal of the millimeter-wave radar is processed according to the following process:

Step 301, the millimeter-wave radar signal (that is, the echo signal of the millimeter-wave radar) is inputed into a low-pass filter (such as an IIR filter), so as to filter out middle and high frequency signals.

Step 302, the filtered millimeter-wave radar signal is converted into a discrete digital signal via analog-to-digital conversion (ADC).

Step 303, frequency domain analysis is performed on the discrete digital signal by using discrete fast Fourier transform (FFT), and extracting spectral information.

Step 304, the information of the moving point is calculated by using the spectral information.

The information of the moving point at least includes speed information and position information of the moving point.

As at least one alternative embodiment, a distance, an azimuth angle and an elevation angle of the moving point are extracted from the spectral information, wherein the distance, the azimuth angle and the elevation angle of the moving point are relative to the millimeter-wave radar, that is, the distance of the moving point refers to the distance between the moving point and the millimeter-wave radar, the azimuth angle of the moving point refers to the azimuth angle formed by the moving point and the millimeter-wave radar, and the elevation angle of the moving point refers to the elevation angle formed by the moving point and the millimeter-wave radar.

Step 305, by means of a constant false-alarm rate (Constant False-Alarm Rate, CFAR) process, and under the condition that the false-alarm rate is kept constant, the noise in the millimeter-wave radar signal is identified and filtered, that is, the signals with lower signal-to-noise ratios is filtered from the millimeter-wave radar signal.

Step 306, on the basis of the FFT transform, by using the Doppler effect and according to different phase differences between previous and subsequent frames, a radial speed of the moving point is estimated.

So far, the distance, the azimuth angle, the elevation angle, the radial speed and the spectral information of the moving point can be obtained. Moreover, during the process of extracting the information of the moving point from the spectral information, the information of the stationary point is filtered out, and the specific position of the moving point in a spatial coordinate system can be calculated according to the obtained information of the moving point.

Step 103: a micro-Doppler feature of each target in the target environment is determined according to the information of the moving points in the target environment.

The target in the target environment is formed by at least one moving point, the millimeter-wave radar signal will include a plurality of moving points of one target, the moving points belonging to the same target may be clustered by using a clustering algorithm, and the features of the target may be obtained according to the clustering result.

As at least one alternative embodiment, determining the micro-Doppler feature of each target in the target environment is as follows: according to the information of the moving points in the target environment, the moving point in the target environment is clustered to obtain at least one clustering result, and each clustering result is taken as a target; each target is tracked to obtain the information of each target in consecutive N frames, wherein the information of the target includes information of each moving point corresponding to the target, and N is an integer greater than 1; and the following processing is respectively performed on each target in the target environment: the micro-Doppler feature of the target is determined according to the information of each target in the consecutive N frames.

It should be noted that, a variety of clustering algorithms may be used for clustering the moving points, and the specific clustering algorithms used are not limited in the embodiments of the present disclosure.

In an alternative embodiment, the clustering process of the moving points is as follows: a moving point is randomly selected from unclustered moving points, using the selected moving point as a center point, and the selected moving point is stored in a set of category a; and the following processing is respectively performed on the unclustered moving points except the center point, until each unclustered moving point is traversed:

step a: the distance between the moving point and the center point is calculated, and whether the distance is greater than a preset threshold is judged;

step b, if it is judged that the distance is greater than the preset threshold, that the moving point and the center point do not belong to the same category is determined, the next moving point from the unclustered moving points is obtained, and step a is executed; and step c, if it is judged that the distance is not greater than the preset threshold, that the moving point and the center point belong to the same category is determined, storing the moving point in the set of category a, an average value of the positions of all moving points in the set of category a is calculated, taking a point determined by the average value as a new center point, the moving point is deleted from the unclustered moving points, the next moving point is obtained from the unclustered moving points, and step a is executed.

At least one clustering result is obtained after clustering is performed via the above process.

The example process of determining the micro-Doppler feature of the target is as follows: the statistics is performed on the speed information of the moving point corresponding to the target in the consecutive N frames, and a maximum Doppler speed, a minimum Doppler speed and an average Doppler speed of the moving point corresponding to the target in the consecutive N frames is determined according to the statistical result, wherein N is an integer greater than 1, for example, N=30; and the maximum Doppler speed, the minimum Doppler speed and the average Doppler speed is determined as the micro-Doppler feature of the target.

It should be noted that, a variety of algorithms may be used for tracking the clustering result, and the specific algorithms used for tracking are not limited in the embodiments of the present disclosure. For example, an extended Kalman filter tracking algorithm is used for tracking the clustering result.

Step 104: a target whose category is human in the target environment is identified according to the micro-Doppler feature of each target in the target environment.

In one embodiment, the process of identifying the target whose category is human in the target environment is as follows: the following processing is respectively performed on each target in the target environment: the micro-Doppler feature of the target is inputted into a classifier model, and whether the category to which the target belongs is human is determined according to the classification result output by the classifier model.

The classifier model is obtained by training a binary classifier model by means of using sample data, and the sample data includes a set of human micro-Doppler features and a set of non-human micro-Doppler features.

In the embodiments of the present disclosure, after the target whose category is human is identified in the target environment, the information of the target whose category is human in the target environment may be further counted, and the target environment is managed according to the information of the target whose category is human in the target environment.

In an example scenario, the human detection method provided in the embodiments of the present disclosure may be used for performing statistics on the number of people in the target environment, that is, statistics is performed on the number of targets whose category is human in the target environment, and the position information of the targets whose category is human in the target environment is obtained.

Figure 4:
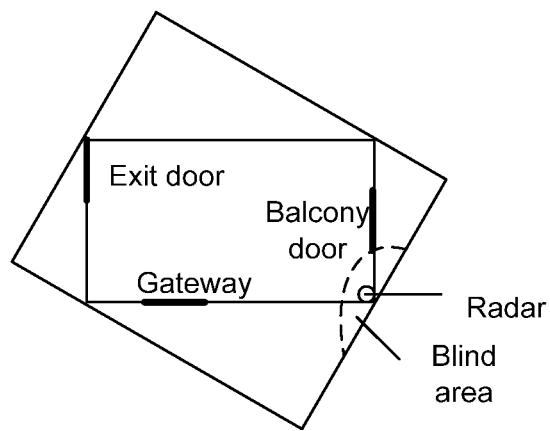
FIG. 4 is a schematic diagram of a living room area and the detection area provided by an embodiment of the present disclosure.

For example, as shown in FIG. 4, the inner small rectangular area is a living room area, and the outer large rectangular area is an area that can be detected by the radar, a living room communicates with other areas through an exit door, a balcony door and a gateway. It is assumed that the number of people in the living room needs to be detected, then the targets that enter the living room from the exit door, the balcony door and the gateway at the beginning are determined as targets to be identified, and the targets appearing in the other areas of the living room are directly deleted, such that the movement of some non-human objects in the living room can be filtered quickly, which indirectly reduces the probability of non-human objects being identified as humans.

Taking a home environment as an example, the number of people in the home and the positions of the people are counted and fed back to an intelligent control system of home appliances, thereby realizing personalized or energy-saving control of the home appliances. For example, when it is detected that there is nobody in the home, if there is a running home appliance, and the home appliance is not set to continue to run in the case of nobody, the running home appliance can be automatically controlled to be turned off.

In addition, according to the statistics of whether there is anyone in the target environment, the target environment may also be intelligently monitored. For example, there is usually nobody in the home environment during working hours, if someone is detected in the home, an alarm prompt is sent to mobile terminals, such as a mobile phone, of a family member in time, so as to confirm whether there are unsafe people in the home.

In the embodiments of the present disclosure, the number of transmitting antenna and receiving antenna arrays of the millimeter-wave radar can be designed according to different application scenarios, and the design principle is to save the cost as much as possible while ensuring the detection accuracy. For example, the number of radar transmitting antennas in the home environment is three, and the number of receiving antennas is four.

In the embodiments of the present disclosure, the target in the target environment is identified by using the millimeter-wave radar signal, and the target whose category is human in the target environment is identified, therefore the millimeter-wave radar technology is combined with artificial intelligence technology, so as to enable human detection in the target environment without invading human privacy, thus providing the possibility of achieving automatic control, monitoring and other operations of the target environment.

Figure 5:
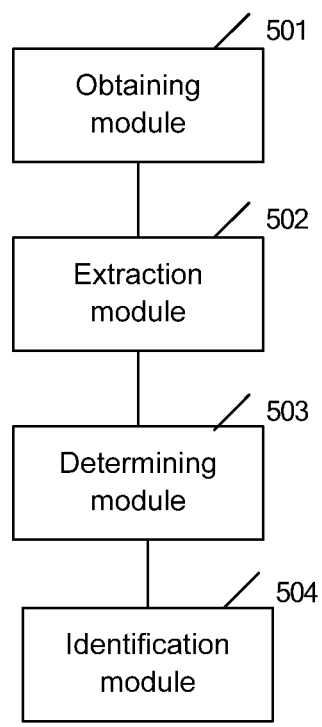
FIG. 5 is a schematic structural diagram of a human detection device provided by an embodiment of the present disclosure.

Based on the same inventive concept, a human detection device is further provided in the embodiments of the present disclosure, for an example implementation of the device, reference can be made to the description in the method embodiment, duplicated details will not be repeated herein, and as shown in FIG. 5, the device mainly includes:
- an obtaining module 501, configured to obtain a millimeter-wave radar signal of a target environment;
- an extraction module 502, configured to extract, from the millimeter wave radar signal, information of a moving point in the target environment;
- a determining module 503, configured to determine, according to the information of the moving points in the target environment, a micro-Doppler feature of each target in the target environment, wherein the target is formed by at least one the moving point; and
- an identification module 504, configured to identify, according to the micro-Doppler feature of each target in the target environment, a target whose category is human in the target environment.

Figure 6:
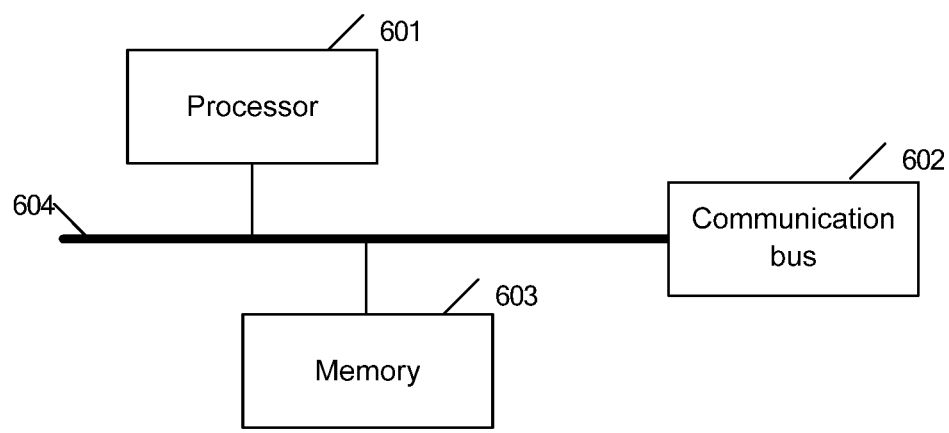
FIG. 6 is a schematic structural diagram of an electronic apparatus provided by an embodiment of the present disclosure.

Based on the same concept, an electronic apparatus is further provided in the embodiments of the present disclosure, as shown in FIG. 6, the electronic apparatus mainly includes: a processor 601, a communication interface 602, a memory 603 and a communication bus 604, wherein the processor 601, the communication interface 602 and the memory 603 complete the communication with each other through the communication bus 604. A program that may be executed by the processor 601 is stored in the memory 603, the processor 601 executes the program stored in the memory 603, so as to implement the following steps: obtaining a millimeter-wave radar signal of a target environment; extracting, from the millimeter-wave radar signal, information of a moving point in the target environment; determining, according to the information of the moving point in the target environment, a micro-Doppler feature of each target in the target environment, wherein the target is formed by at least one the moving point; and identifying, according to the micro-Doppler feature of each target in the target environment, a target whose category is human in the target environment.

According to the electronic apparatus provided in the embodiments of the present disclosure, the processor executes the program stored in the memory, identifies the target in the target environment by using the millimeter-wave radar signal, and identifies the target whose category is human in the target environment, such that the millimeter-wave radar technology is combined with artificial intelligence technology, so as to enable human detection in the target environment without invading human privacy, thus providing the possibility of achieving automatic control, monitoring and other operations of the target environment The communication bus 604 mentioned in the above electronic apparatus can be a peripheral component interconnect (Peripheral Component Interconnect, referred to as PCI) bus or an extended industry standard architecture (Extended Industry Standard Architecture, referred to as EISA) bus, or the like. The communication bus 604 can be divided into an address bus, a data bus, a control bus, and the like. For ease of representation, the communication bus is only expressed by a thick line in FIG. 6, but it does not mean that there is only one bus or one type of buses.

The communication interface 602 is used for the communication between the above electronic apparatus and other apparatuses.

The memory 603 can include a random access memory (Random Access Memory, referred to as RAM), and can also include a non-volatile memory (non-volatile memory), for example, at least one magnetic disk memory. In some embodiments, the memory can also be at least one storage device located far from the foregoing processor 601.

The above processor 601 can be a general-purpose processor, including a central processing unit (Central Processing Unit, referred to as CPU), a network processor (Network Processor, referred to as NP), and the like, and can also be a digital signal processing (Digital Signal Processing, referred to as DSP), an application specific integrated circuit (Application Specific Integrated Circuit, referred to as ASIC), a field-programmable gate array (Field-Programmable Gate Array, referred to as FPGA) or other programmable logic devices, discrete gates or transistor logic devices, and discrete hardware components.

In still another embodiment of the present disclosure, a computer-readable storage medium is further provided, a computer program is stored in the computer-readable storage medium, and when the computer program runs on a computer, the computer executes the human detection method described in the above embodiment.

In the above embodiments, it can be implemented in whole or in part by software, hardware, firmware or any combination thereof. When implemented by software, it can be implemented in whole or in part in the form of a computer program product. The computer program product includes one or more computer instructions. When the computer instruction is loaded and executed on a computer, the processes or functions according to the embodiments of the present disclosure are entirely or partially generated. The computer can be a general-purpose computer, a special-purpose computer, a computer network, or other programmable devices. The computer instruction can be stored in a computer-readable storage medium or is transmitted from one computer-readable storage medium to another computer-readable storage medium, for example, the computer instruction is transmitted from one website, computer, server or data center to another website, computer, server or data center in a wired (for example, a coaxial cable, an optical fiber, a digital subscriber line (DSL)) or wireless (for example, infrared, microwave, and the like) manner. The computer-readable storage medium can be any available medium that can be accessed by the computer or a data storage device such as a server and a data center, which includes one or more available medium for integration. The available medium can be a magnetic medium (such as a floppy disk, a hard disk and a magnetic tape), an optical medium (such as a DVD), or a semiconductor medium (such as a solid state hard disk).

It should be noted that, in this article, relational terms such as "first" and "second" are only used for distinguishing one entity or operation from another entity or operation, and do not necessarily require or imply that there is any such actual relationship or sequence between these entities or operations. Moreover, the terms "including", "comprising" or any other variations thereof are intended to encompass non-exclusive inclusions, such that a process, a method, an article or an apparatus that includes a series of elements not only includes those elements, but also includes other elements that are not explicitly listed, or elements inherent to this process, method, article or apparatus. Without more restrictions, the element defined by the sentence "including a . . . " does not exclude the existence of other identical elements in the process, method, article or apparatus that includes the element.

The above descriptions are only specific embodiments of the present disclosure, so that those skilled in the art can understand or implement the present disclosure. Various modifications to these embodiments will be apparent to those skilled in the art, and the general principles defined herein may be implemented in other embodiments without departing from the spirit or scope of the present disclosure. Therefore, the present disclosure will not be limited to these embodiments shown herein, but should conform to the widest scope consistent with the principles and novel features applied herein.

What is claimed is:

1. A human detection method, comprising:
   obtaining a millimeter-wave radar signal of a target environment;
   extracting, from the millimeter-wave radar signal, information of a moving point in the target environment;
   determining, according to the information of the moving point in the target environment, a micro-Doppler feature of each target in the target environment, wherein the target is formed by at least one the moving point; and
   identifying, according to the micro-Doppler feature of each target in the target environment, a target whose category is human in the target environment;
   wherein determining, according to the information of the moving point in the target environment, the micro-Doppler feature of each target in the target environment comprises:
   according to the information of the moving point in the target environment, clustering the moving point in the target environment to obtain at least one clustering result, and taking each clustering result as a target;
   tracking each target to obtain the information of each target in consecutive N frames, wherein the information of the target comprises information of each moving point corresponding to the target, and N is an integer greater than 1; and
   respectively performing the following processing on each target in the target environment:
   determining, according to the information of each target in the consecutive N frames, the micro-Doppler feature of the target;
   wherein determining, according to the information of each target in the consecutive N frames, the micro-Doppler feature of the target comprises:
   performing statistics on the speed information of the moving point corresponding to the target in the consecutive N frames, and determining, according to a statistical result, a maximum Doppler speed, a minimum Doppler speed and an average Doppler speed of the moving point corresponding to the target in the consecutive N frames, wherein N is an integer greater than 1; and
   determining the maximum Doppler speed, the minimum Doppler speed and the average Doppler speed as the micro-Doppler feature of the target;
   wherein before extracting, from the millimeter-wave radar signal, the information of the moving points in the target environment, the method further comprises:
   removing, from the millimeter-wave radar signal, the information of the moving point that does not belong to the target environment; and
   removing, from the millimeter-wave radar signal, the information of the moving point that does not enter the target environment from a specified area.

2. The human detection method according to claim 1, wherein after identifying, according to the micro-Doppler feature of each target in the target environment, the target whose category is human in the target environment, the method further comprises:
   performing statistics on the information of the target whose category is human in the target environment, and obtaining a statistical result; and
   managing the target environment according to the statistical result.

3. The human detection method according to claim 2, wherein the information of the moving point comprises: speed information and position information of the moving point.

4. The human detection method according to claim 3, wherein identifying, according to the micro-Doppler feature of each target in the target environment, the target whose category is human in the target environment comprises:
   respectively performing the following processing on each target in the target environment: inputting the micro- Doppler feature of the target into a classifier model, and determining whether a category to which the target belongs is human according to a classification result output by the classifier model;

wherein the classifier model is obtained by training a binary classifier model by means of using sample data, and the sample data comprises a set of human micro-Doppler features and a set of non-human micro-Doppler features.

5. The human detection method according to claim 1, wherein before extracting, from the millimeter-wave radar signal, the information of the moving points in the target environment, the method further comprises:

removing, from the millimeter-wave radar signal, the information of the moving point that does not belong to the target environment.

6. The human detection method according to claim 1, wherein before extracting, from the millimeter-wave radar signal, the information of the moving points in the target environment, the method further comprises:

removing, from the millimeter-wave radar signal, the information of the moving point that does not enter the target environment from a specified area.

7. The human detection method according to claim 1, wherein identifying, according to the micro-Doppler feature of each target in the target environment, the target whose category is human in the target environment comprises:

respectively performing the following processing on each target in the target environment: inputting the micro-Doppler feature of the target into a classifier model, and determining whether a category to which the target belongs is human according to a classification result output by the classifier model;

wherein the classifier model is obtained by training a binary classifier model by means of using sample data, and the sample data comprises a set of human micro-Doppler features and a set of non-human micro-Doppler features.

8. The human detection method according to claim 1, wherein identifying, according to the micro-Doppler feature of each target in the target environment, the target whose category is human in the target environment comprises:

respectively performing the following processing on each target in the target environment: inputting the micro-Doppler feature of the target into a classifier model, and determining whether a category to which the target belongs is human according to a classification result output by the classifier model;

wherein the classifier model is obtained by training a binary classifier model by means of using sample data, and the sample data comprises a set of human micro-Doppler features and a set of non-human micro-Doppler features.

9. An electronic apparatus, comprising: a processor, a communication interface, a memory and a communication bus, wherein the processor, the communication interface and the memory complete communication with each other through the communication bus;

the memory is configured to store a computer program; and the processor is configured to execute the program stored in the memory, so as to implement the human detection method according to the following actions:

obtaining a millimeter-wave radar signal of a target environment;

extracting, from the millimeter-wave radar signal, information of a moving point in the target environment;

determining, according to the information of the moving point in the target environment, a micro-Doppler feature of each target in the target environment, wherein the target is formed by at least one the moving point; and identifying, according to the micro-Doppler feature of each target in the target environment, a target whose category is human in the target environment;

wherein determining, according to the information of the moving point in the target environment, the micro-Doppler feature of each target in the target environment comprises:

according to the information of the moving point in the target environment, clustering the moving point in the target environment to obtain at least one clustering result, and taking each clustering result as a target;

tracking each target to obtain the information of each target in consecutive N frames, wherein the information of the target comprises information of each moving point corresponding to the target, and N is an integer greater than 1; and respectively performing the following processing on each target in the target environment: determining, according to the information of each target in the consecutive N frames, the micro-Doppler feature of the target;

wherein determining, according to the information of each target in the consecutive N frames, the micro-Doppler feature of the target comprises:

performing statistics on the speed information of the moving point corresponding to the target in the consecutive N frames, and determining, according to a statistical result, a maximum Doppler speed, a minimum Doppler speed and an average Doppler speed of the moving point corresponding to the target in the consecutive N frames, wherein N is an integer greater than 1; and determining the maximum Doppler speed, the minimum Doppler speed and the average Doppler speed as the micro-Doppler feature of the target;

wherein before extracting, from the millimeter-wave radar signal, the information of the moving points in the target environment, the method further comprises:

removing, from the millimeter-wave radar signal, the information of the moving point that does not belong to the target environment; and removing, from the millimeter-wave radar signal, the information of the moving point that does not enter the target environment from a specified area.

10. A non-transitory computer-readable storage medium, storing a computer program, wherein the computer program implements the human detection method according to the following actions:

obtaining a millimeter-wave radar signal of a target environment;

extracting, from the millimeter-wave radar signal, information of a moving point in the target environment;

determining, according to the information of the moving point in the target environment, a micro-Doppler feature of each target in the target environment, wherein the target is formed by at least one the moving point; and identifying, according to the micro-Doppler feature of each target in the target environment, a target whose category is human in the target environment;

wherein determining, according to the information of the moving point in the target environment, the micro-Doppler feature of each target in the target environment comprises:

according to the information of the moving point in the target environment, clustering the moving point in the target environment to obtain at least one clustering result, and taking each clustering result as a target;

tracking each target to obtain the information of each target in consecutive N frames, wherein the information of the target comprises information of each moving point corresponding to the target, and N is an integer greater than 1; and respectively performing the following processing on each target in the target environment:

determining, according to the information of each target in the consecutive N frames, the micro-Doppler feature of the target;

wherein determining, according to the information of each target in the consecutive N frames, the micro-Doppler feature of the target comprises:

performing statistics on the speed information of the moving point corresponding to the target in the consecutive N frames, and determining, according to a statistical result, a maximum Doppler speed, a minimum Doppler speed and an average Doppler speed of the moving point corresponding to the target in the consecutive N frames, wherein N is an integer greater than 1; and determining the maximum Doppler speed, the minimum Doppler speed and the average Doppler speed as the micro-Doppler feature of the target;

wherein before extracting, from the millimeter-wave radar signal, the information of the moving points in the target environment, the method further comprises:

removing, from the millimeter-wave radar signal, the information of the moving point that does not belong to the target environment; and removing, from the millimeter-wave radar signal, the information of the moving point that does not enter the target environment from a specified area.

* * * * *